United States Patent Office 3,482,991
Patented Dec. 9, 1969

3,482,991
PROCESS FOR PREPARING TEA EXTRACTS
Charles W. Schroeder, Teaneck, N.J., assignor to Thomas J. Lipton, Inc., Englewood Cliffs, N.J., a corporation of Delaware
No Drawing. Filed Jan. 13, 1966, Ser. No. 520,354
Int. Cl. A23f *3/02*
U.S. Cl. 99—77                                    5 Claims

ABSTRACT OF THE DISCLOSURE

The yield of water-extractable solids from manufactured tea is increased by exposing the tea to an effective dose of ionizing radiation.

---

This invention relates to a process for preparing water extracts of manufactured teas and more particularly to a process for improving the yield of water-extractable matter obtainable from tea leaves.

Tea, as a beverage, is an aqueous liquor or infusion comprising the water-extractable components of tea leaves. Such liquors are prepared by steeping the tea leaves in boiling water thereby drawing the water-extractable matter from the leaves. An infusion of the water-extractable components can be evaporated and dried to provided a solid powdery material which can be referred to as powdered or instant tea. This materal can be reconstituted by simply adding water to the powder.

Since the strength of a brew of tea reflects, at least in part, the amount of water-extractable matter in the brew, it is apparent that it is desirable to increase the yield of water-extractable matter which can be obtained from a given weight of manufactured tea leaves.

Accordingly, it is an object of this invention to improve the yield of water-extractable matter which can be obtained from tea leaves.

This invention is based upon the discovery that manufactured green or black tea will provide substantially improved yields of water-extractable solids as a result of being subjected to ionizing radiation.

The term "manufactured tea" as used herein, refers to tea leaves which have been subjected to the known steps of tea processing, including withering, steaming, rolling, optional fermentation, and drying, and includes both fermented and unfermented teas.

The radioactivity resulting from the decay of radioactive materials such as the radioactive isotopes or an electron beam from an electron accelerator or X-rays may be employed as a source of ionizing radiation in order to expose the tea leaves to an effective dose of ionizing radiation. The term "effective dose" as used herein, including the appended claims, refers to a dose which is sufficient to increase the amount of water-extractable matter which can be withdrawn or extracted from the tea leaves by steeping the leaves in water at elevated temperatures. An average absorbed dose of from about 1 to about 26 megarads has been found to be effective.

Inasmuch as alpha or beta radiation may be undesirable from the standpoint of delivering excessive doses of radiation to the surface of the material being treated, and similarly, neutron radiation may be undesirable due to the danger of generating radioactivity in the material being treated, the source may be shielded to absorb these less desirable types of radiation, to insure a uniform absorption of the more desirable ionizing radiation, and to prevent generation of radioactivity.

It is noted that photon-induced nuclear reactions such as gamma-neutron or gamma-proton reactions with accompanying induced radioactivity do not occur in the elements generally present in foods until the photon energy reaches about 10 million electron volts (mev.). Similarly, electron-induced nuclear reactions are not encountered below about 10 mev. Accordingly, it is desirable, when treating the tea according to this invention, that the photon or electron energy level be no more than about 10 million electron volts.

While gamma sources can be used, a higher radiation level is generally obtained in a shorter period of time by using the electron beam of an electron accelerator such as a Van de Graaff-type generator. One such electron accelerator of medium size operates at about 2 million volts and a maximum of about 250 microamperes of beam current. For convenience, this type of source is presently preferred, although it should be recognized that any suitable source of ionizing radiation may be employed for the purposes of this invention. Other sources of ionizing radiation include mixed fission products obtained from a nuclear reactor, provided that any undesirable radiation is screened out, pile-activated isotopes such as Cobalt 60, X-rays produced by impinging a beam of high energy electrons on a suitable target, and other types of electron accelerators.

In irradiating the tea, it is preferred that the tea leaves be arranged in such a manner that substantially uniform exposure to the ionizing radiation is obtained. For example, where an electron accelerator is employed, the samples, placed in suitable containers, can be disposed in a layer having a thickness which is up to the maximum range of the electrons. When a Van de Graaff accelerator as described above is employed, a layer of up to about 0.8 grams per square centimeter is preferred for economical utilization of the beam energy while maintaining fairly uniform treatment of the tea. Other methods for improving the uniformity of irradiation and the efficiency of its utilization, e.g., cross firing and beam scanning, are well known in the art and such techniques are generally applicable to this invention where suitable facilities are available. The Van de Graaff electron generator mentioned above has a maximum range of about 1 gram per square centimeter when operating at a votage of about 2 million electron volts. Greater penetration can be obtained by operating electron accelerators at higher voltages. Subject to the limitations of induced radioactivity within the range of interest of this application, the degree of penetration is essentially proportional to the voltage.

The containers for the tea can be conveniently loaded onto a conveyor belt or other stage moving at 40 inches per minute and passed through an electron beam which is preferably scanned back and forth across the moving stage at, for example, 200 cycles per second with a 7 inch sweep. These conditions will give a sufficiently uniform 2 million rep dose when using the full 250 microampere beam current. A "rep" is a Roentgen-equivalent-physical, which is a unit of absorbed energy equal to 83.3 ergs per gram of irradiated product (1 million rep equals 3.8 kilowatt seconds per pound). An increase in dosage may be obtained by successively passing the material through the electron beam. Smaller dosages may be obtained by a reduction of the current employed in the accelerator. Another term commonly employed to designate an amount of radiation is the "rad." A "rad" is defined as the amount of radiation producing an energy absorption of 100 ergs per gram of irradiated material.

Known sources of gamma radiation may also be employed and utilized in any of the various procedures and techniques which are known to those in the art to produce the desired dosage of radiation in the tea. As mentioned above, the radioisotope Cobalt 60 may be employed. This radioisotope emits gamma rays having an energy of 1.17 and 1.33 mev. (million electron volts) as well as a beta ray of 0.31 mev. The beta ray will normally be screened out by self-absorption or by the surrounding container. It is not essential that the beta ray be screened since it is identical to that of an electron beam of the same energy level; therefore, it has the same effect. However, due to its short penetration range, about 0.15 gram per square centimeter, it would tend to induce non-uniform dosages in materials which are exposed to such radiation in layers of more than 0.15 gram per centimeter thickness. Accordingly, in the interest of providing uniform dosages of radiation, the screening of this beta radiation is desirable.

Other conditions for the optimum utilization of gamma-emitting isotopes are well known to those skilled in the art. These include the optimum shape and disposition of the source, the relative desirability of various types of sources, and the types of shielding equipment employed.

The type of radiation, whether electro-magnetic or charged particles, has little influence on the success of the invention. For practical purposes, gamma rays from radioisotopes or electron beams from accelerators are the most useful sources of radiation.

In preparing tea for treatment according to this invention, it is generally preferred that the tea leaves be reduced to a reasonably uniform particle size.

The following examples illustrate the principles and practice of this invention.

EXAMPLE 1

Three varieties of manufactured black tea and one manufactured green tea were irradiated by an electron beam of a Van de Graaff accelerator at 2 million volts to provide dosages from 1 to 8 million rep. The irradiated teas were brewed into beverages and then compared for flavor, color, aroma, creaming characteristics (black teas only), and extractable solids. The use of irradiation was found to provide for extraction of increased amounts of soluble solids from the tea. Flavor, color and creaming characteristics of the irradiated teas were found to be generally comparable to a non-irradiated control sample which, with the exception of irradiation, was treated and brewed in the same manner. Extractable solids were determined by Method 14–032-Water Extract-(5), Official Methods of Analysis of the Association of Official Agricultural Chemists, 9th Edition, 1960, page 184.

TABLE 1.—PERCENT EXTRACTABLE SOLIDS

|  | Dose in Reps | | | | |
| --- | --- | --- | --- | --- | --- |
|  | Control | 1×10⁶ | 2×10⁶ | 4×10⁶ | 8×10⁶ |
| Green Tea | 37.2 | 35.9 | 36.7 | 38.9 | 39.7 |
| Black Tea 1 | 39.4 | 40.8 | 40.8 | 42.0 | 43.3 |
| Black Tea 2 | 40.6 | 40.4 | 40.4 | 41.1 | 42.0 |
| Black Tea 3 | 39.6 | 39.6 | 41.0 | 42.2 | 43.8 |

EXAMPLE 2

Samples of manufactured green Ceylon tea, having normal moisture levels, were prepared for irradiation in aluminum foil packets. The aluminum foil weighed 4.7 milligrams per square centimeter. Each packet contained 40 grams of tea, and it was wrapped in such a manner that the aluminum foil did not overlap and that the tea in each packet was shielded by a single layer of aluminum foil. The packages were 6 inches square and provided a layer of tea of about 0.17 gram per square centimeter. The samples were then placed on a rotating drum having a circumference of about 72 inches which was set to rotate at 19 revolutions per minute. The samples were then irradiated in air at ambient temperatures with a 2.0 mev. (million electron volts) beam from an electron accelerator with a beam current of 2.0 milliamperes. Under these conditions the surface dose received by each sample was approximately 1.0 mr. (megarad) in each 24 seconds of exposure. By varying the exposure time between 24 seconds and six minutes total dosages ranging from 1 to 15 mr. (megarads) were provided. Another packet exactly as described above, was prepared for use as a control. This packet was not irradiated.

After irradiation, a portion of the tea in each packet was removed and the extractable solids determined according to the AOAC method 14–032 referred to above. Table II below sets forth the results obtained for each sample.

TABLE II

| Sample | Exposure time | Surface dose, mr. | Average dose, mr. | Extractable[1] solids, percent | Moisture content, percent |
| --- | --- | --- | --- | --- | --- |
| Control | 0 | 0 | 0 | 49.8 | 4.17 |
| 1 | 24 sec | 1 | 1.2 | 50.3 | 4.21 |
| 2 | 96 sec | 4 | 4.8 | 52.5 | 4.47 |
| 3 | 6 min | 15 | 18 | 57.9 | 3.65 |

[1] Dry basis.

An extract of the leaf of each sample was then prepared by combining about 15 grams of leaf and about 100 grams of boiling distilled water and steeping the resulting admixture for a period of about 5 minutes. The extract was then filtered through cheesecloth, frozen, and freeze-dried.

A 5% aqueous infusion of the dried extract was then prepared. The color of the infusion was measured with a Klett colorimeter using a number 42 filter.

Table III below sets forth the pertinent data.

TABLE III

|  | Visual color | Klett color | pH[1] |
| --- | --- | --- | --- |
| Sample: |  |  |  |
| Control | Green | 75 | 5.30 |
| 1 | do | 74 | 5.25 |
| 2 | do | 64 | 5.30 |
| 3 | Slightly red | 60 | 5.25 |

[1] Determined on a portion of the extract before freeze drying.

EXAMPLE 3

Another series of 4 samples of the manufactured green Ceylon tea used in Example 2 was prepared for irradiation in the manner described above. In this case each packet contained 20 grams of tea and 20 grams of distilled water uniformly absorbed on the tea leaves. This amount of water was just sufficient to moisten the leaves without drainage from the packet or extraction of any water soluble solids from the tea. Three packets were irradiated with increasing dosages as described in Example 2 and the fourth was used as a control. After the irradiation all the samples were frozen and freeze-dried. The amount of water-extractable matter was determined on the dried leaf by the AOAC method described in Example 2. Table IV below sets forth the pertinent data.

TABLE IV

| Sample | Exposure time | Surface dose, mr. | Average dose, mr. | Extractable[1] solids, percent | Moisture content, percent |
| --- | --- | --- | --- | --- | --- |
| Control | 0 | 0 | 0 | 49.5 | 1.00 |
| 1 | 24 sec | 1 | 1.2 | 50.4 | 1.17 |
| 2 | 96 sec | 4 | 4.8 | 53.5 | 1.04 |
| 3 | 6 min | 15 | 18 | 57.7 | 1.52 |

[1] Dry basis.

An extract of the dried leaf was prepared by combining about 15 grams of leaf with about 100 grams of boiling distilled water. The leaf was allowed to steep for about 5 minutes. The resulting extract was then filtered through cheesecloth, frozen, and freeze-dried. A 5 percent aqueous infusion of the dried extract was prepared for colorimetric measurements as in Example 2. Table V below sets forth the results obtained.

TABLE V

| | Visual color | Klett color | pH[1] |
|---|---|---|---|
| Sample: | | | |
| Control | Green | 81 | 5.30 |
| 1 | do | 82 | 5.35 |
| 2 | do | 68 | 5.30 |
| 3 | do | 61 | 5.35 |

[1] Determined on a portion of the extract before freeze drying.

An extract of each sample shown in Table VI was prepared by adding 2 grams of tea to 200 milliliters of boiling water and steeping the tea for a period of 5 minutes after which the leaves were removed by straining. The resulting brews were then compared for flavor, aroma, and color (visually). The results are set forth in Table VII, below. The black teas were tasted with and without milk.

TABLE VII.—SAMPLE

| | Visual Color | Aroma | Flavor |
|---|---|---|---|
| Manufactured Black Tea: | | | |
| 1 | | | |
| 2 | | | |
| 2 | (All black tea brews similar in color, flavor and aroma whether or not milk was added.) | | |
| 3 | | | |
| 4 | | | |
| Manufactured Green Tea: | | | |
| 5 | Lightest, typical green tea | All green teas similar | Slight development of black tea character with increasing dose, paralleling color development. |
| 6 | | | |
| 7 | Increasing color with dose, less green, more like black tea. | | |
| 8 | | | |
| 9 | | | |
| 10 | Darkest, but still much lighter and less red-brown than a black tea. | | |

EXAMPLE 4

Samples of manufactured green and black teas were subjected to varying doses of radiation by means of a Van de Graaff accelerator operating at 3 mev. (million electron volts) having a 13 inch scan (flat portion), a beam current variable to 1 milliampere and a conveyor speed of 93 inches per minute thereby providing a surface dose of 1 megarad per pass at maximum beam current. The samples were evenly distributed in 12 inch by 18 inch aluminum trays at a sample thickness of 0.5 gram per square centimeter.

After irradiation a portion of the tea in each tray was removed and the extractable solids, the pH, and the Klett color were determined as described in Example 2, above. Table VI below sets forth data obtained for each sample of tea.

TABLE VI

| | Average dose | Surface dose | Extractable solids, percent[1] | pH | Klett color |
|---|---|---|---|---|---|
| Black Tea: | | | | | |
| 1 | 0 | 0 | 38.7 | 4.68 | 319 |
| 2 | 5.4 | 4 | 41.5 | 4.65 | 283 |
| 3 | 10.8 | 8 | 43.5 | 4.70 | 272 |
| 4 | 16.2 | 12 | 44.8 | 4.70 | 263 |

| | Average dose | Surface dose | Extractable solids, percent[1] | pH | Klett color |
|---|---|---|---|---|---|
| Green Tea: | | | | | |
| 5 | 0 | 0 | 41.7 | 5.20 | 118 |
| 6 | 5.4 | 4 | 42.2 | 5.25 | 96 |
| 7 | 10.8 | 8 | 43.6 | 5.25 | 103 |
| 8 | 16.2 | 12 | 45.3 | 5.20 | 94 |
| 9 | 20.2 | 15 | 47.1 | 5.15 | 92 |
| 10 | 25.7 | 19 | 47.4 | 5.15 | 84 |

[1] Dry Basis.

What is claimed is:

1. A process for improving the yield of water-extractable solids obtainable from tea which comprises exposing manufactured tea to a source of ionizing radiation having an energy level of no more than 10 mev. to provide an average absorbed dose of from about 1 to about 26 megarads.

2. The process of claim 1, wherein the water-extractable components are separated from the irradiated leaves by steeping the leaves in water.

3. The process of claim 1 wherein the ionizing radiation is an electron beam.

4. The process of claim 1 wherein the source of the ionizing radiation is an electron accelerator.

5. The process of claim 1 wherein the leaves are arranged in a layer of uniform thickness prior to exposure to the effective dose of ionizing radiation thereby to provide a substantially uniform exposure to the ionizing radiation.

References Cited

UNITED STATES PATENTS 2,278,474   4/1942   Musher _____ 99—76
3,149,977   9/1964   Baldwin et al. _____ 99—68 X MAURICE W. GREENSTEIN, Primary Examiner U.S. Cl. X.R.

99—76